June 16, 1942.          L. E. MILLER          2,286,370
ELECTRICAL CONTROL SYSTEMS
Filed Dec. 20, 1940
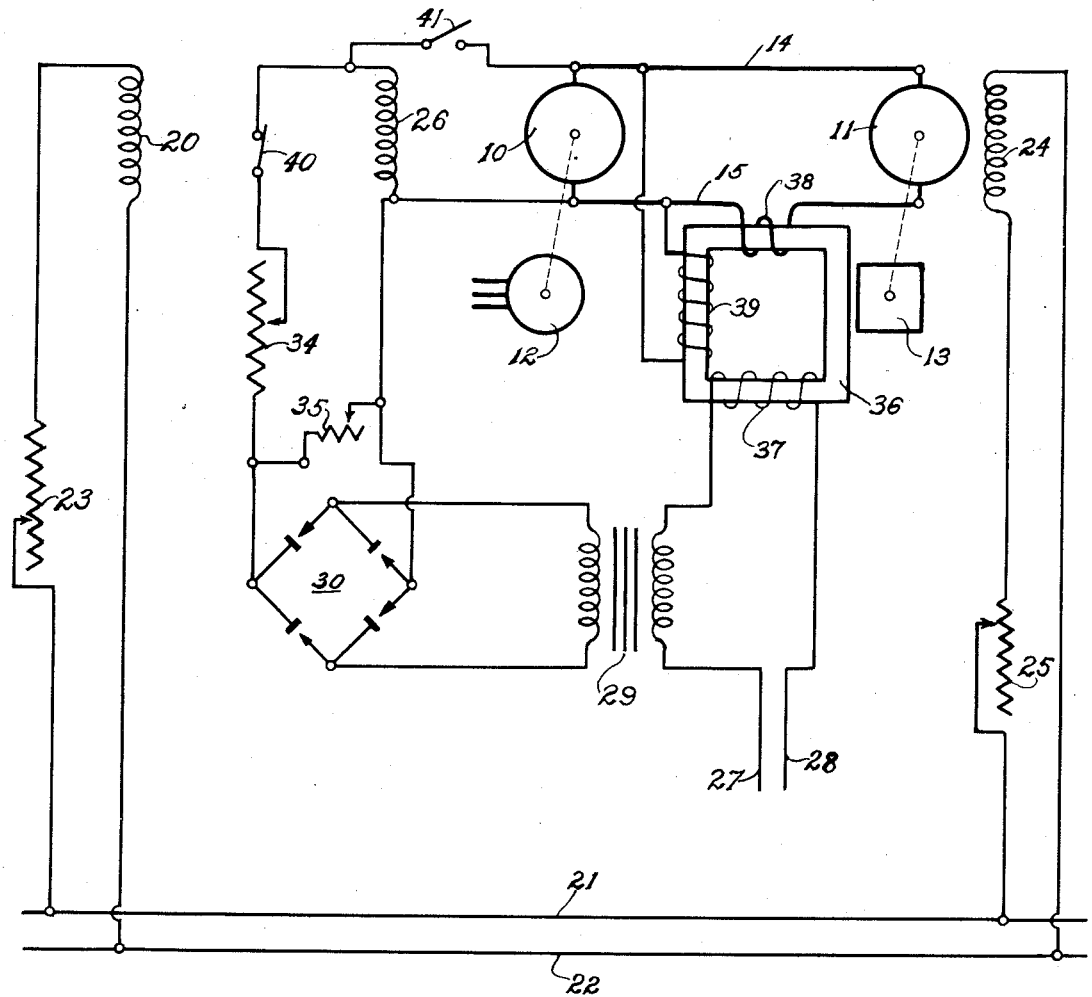
INVENTOR.
Lloyd E. Miller
BY Hoodling and Krost
attys Patented June 16, 1942

2,286,370

UNITED STATES PATENT OFFICE 2,286,370

ELECTRICAL CONTROL SYSTEMS

Lloyd E. Miller, Cleveland, Ohio, assignor to The Reliance Electric & Engineering Company Application December 20, 1940, Serial No. 370,925

3 Claims. (Cl. 172—239)

My invention relates in general to electrical control systems and more particularly to variable voltage systems having a generator and a motor connected in loop armature circuit relation with each other.

In a variable voltage system, the speed of the motor is varied by varying or changing the voltage of the generator. When operating under a variable load condition, wherein the speed tends to change for variable load values, the speed may be maintained at a substantially constant value by varying or correcting the voltage of the variable voltage system. The relationship of a change in the speed of the motor brought about by a change or correction of the voltage of the generator is not always a constant. I find that a greater change or correction in the voltage of the generator is required at low generator voltages than at high generator voltages to effect the same change in speed. In other words, a constant change or correction in the voltage of the generator is undesirable inasmuch as more corrective action is required at low generator voltages than is required at high generator voltages. The fact that more corrective action is required at low generator voltages than at high generator voltages may, in part, result from poorer voltage regulation under low voltage conditions than under high voltage conditions, or may, in part, result from the fact that the resistance drop in the motor is in an increased proportion of the impressed voltage under low voltage conditions than under high voltage conditions. Consequently, with a constant correction in the voltage of the generator, the motor becomes unstable under certain speed values.

A direct current motor is said to be stable when the change in speed resulting from a change in load is such that no cumulative action can take place. For instance, if the speed decreases with an increase in load, a stable condition prevails since such decrease in speed tends to reduce the load and hence decreases the cause of such change in speed. If, on the other hand, the speed increases with an increase in load, an unstable condition prevails since such speed increase produces an increase in load and this increase in load produces a still further increase in load, thus setting up an undesirable, unstable cycle.

The speed regulation of a motor is expressed as the difference in speed between the no-load speed and the full-load speed divided by the full-load speed. It is generally expressed as a percentage. The term positive regulation refers to conditions where the full-load speed is lower than the no-load speed, representing a stable condition of the motor, and the term negative regulation refers to conditions where the full-load speed is higher than the no-load speed, representing an unstable condition of the motor.

The speed of a direct current motor is proportional to the E. M. F. generated in its armature. The motor operates at such a speed as to maintain a condition expressed in the equation:

$$\text{Impressed voltage} - RI \text{ (drop)} = \text{generated E. M. F.} \quad (1)$$

where R is the resistance of the motor (armature+intercoils+series coils if any) and I is the current passing through these parts. The above Equation 1 makes it appear that a direct current motor is bound to have a stable speed characteristic. This would be true if the flux in the motor did not vary. In practically all direct current motors of modern design, the relations between the electrical and magnetic conditions are such that the amount of the decrease in flux resulting from an increased load is very material. This decrease in flux results from the "blowing out" effect of the armature magneto motive force.

Since the generated E. M. F. for any given motor can be expressed by the equation:

$$\text{E. M. F.} = \text{flux} \times \text{speed} \times \text{a constant} \quad (2)$$

it can be observed by combining Equations 1 and 2, evolving the following equation:

$$\text{Speed} = \frac{\text{impressed voltage} - RI \text{ (drop)}}{\text{flux} \times \text{a constant}} \quad (3)$$

that the speed is a variable depending upon the electrical and magnetic conditions of the motor. The RI (drop) tends to decrease the speed and the weakening of the field produced by the "blowing out" effect of the armature tends to increase the speed.

The speed relation between no-load and full-load speed can be expressed as:

$$S_1 \times \frac{\Phi}{f} \times \frac{V - RI}{V} = S_2 \quad (4)$$

where $S_1$ = speed expressed in percentage of a no-load speed at a given voltage
$\Phi$ = flux (no-load condition) 100% or 1.00
$f$ = factor expressing the weakened flux effect
$V$ = impressed voltage (no load)
$RI$ = Resistance drop
$S_2$ = full load speed expressed in percentage of no-load speed at a given voltage.

Example

In Equation 4 by assuming "$f$" as .95; "$\Phi$" as 1; "$S_1$" as 100%; and RI as 5, the following conditions prevail for assumed values of impressed voltages of 100, 80, 60, 40, 20, and 10.

| Impressed voltage | $S_1$ | $S_2$ | Speed regulation $\frac{S_1-S_2}{S_2}$ |
|---|---|---|---|
| 100 | $100 \times \frac{1}{.95} \times \frac{100-5}{100} = 100$ | | Flat speed characteristic at full voltage. |
| 80 | $100 \times \frac{1}{.95} \times \frac{80-5}{80} = 98.5$ | | 1.5% positive regulation. |
| 60 | $100 \times \frac{1}{.95} \times \frac{60-5}{60} = 96.5$ | | 3.8% positive regulation. |
| 40 | $100 \times \frac{1}{.95} \times \frac{40-5}{40} = 92.2$ | | 8.5% positive regulation. |
| 20 | $100 \times \frac{1}{.95} \times \frac{20-5}{20} = 79.0$ | | 26.6% positive regulation. |
| 10 | $100 \times \frac{1}{.95} \times \frac{10-5}{10} = 52.7$ | | 90% positive regulation. |

Assuming that the generator is working on the straight line portion of the saturation curve (and this is often done when rapid changes of voltage are required), producing equal changes in the armature voltage for equal changes of field strength, and referring again to the example, I find that if an attempt is made to correct the 10 volt condition to cause the motor to give a flat speed characteristic, then the generated E. M. F. in the motor has to be increased from $$(10-5) \text{ to } (10-5) \times \frac{100}{52.7} \text{ or to } 9.5$$

Since the RI drop is 5, the impressed voltage upon the motor must be corrected or increased to 9.5+5, or to 14.5. This is an increase of 14.5—10, or 4.5. This is an increase of 14.5—10, or 4.5 volts. The 10 volt condition, with an increase or correction of 4.5 volts, becomes:

$$100 \times \frac{1}{9.5} \times \frac{14.5-5}{10} = 100 \text{ (a flat speed characteristic)}$$

But, referring back to the 100 volt condition, with an increase or correction of 4.5 volts, I find that as the load is applied, the following condition prevails:

$$100 \times \frac{1}{9.5} \times \frac{104.5-5}{100} = 105 \text{ (an unstable condition)}$$

From the above facts and the example, it is noted that if a stable condition of the motor is to exist at all speeds and voltages, the changes in the field strength of the generator must be of such a nature as to give a greater corrective action at low voltages than at high voltages.

While the above description makes use of certain specific examples, such examples should not be taken as limiting the use of such control from other conditions. For instance, a flat speed characteristic is not necessarily desirable but is used merely for the particular example because it makes the calculations easier. The same general calculations would hold if a 5% or 10% positive speed regulation were used as a starting reference. As a matter of fact, I prefer these latter figures since a flat characteristic or even a 1% or 2% positive regulation is too close to an unstable condition. I prefer to have more leeway.

Therefore, an object of my invention is the provision in a variable voltage system for rendering the motor stable under all operating conditions.

Another object of my invention is the provision in a variable voltage system of providing a greater corrective action at low voltages than at high voltages.

Another object of my invention is the provision of a regulating device for a variable voltage system in which the regulating device is adapted to so regulate the field strength of the generator as to render the motor stable under all operating conditions.

Another object of my invention is the provision of a regulating device for a variable voltage system in which the regulating device produces a greater corrective action in the field strength of the generator at low voltages than at high voltages.

Another object of my invention is the provision of a regulating device for a variable voltage system in which the regulating device produces a greater corrective action in the field strength of the generator at low voltages than at high voltages, together with means to destroy the residual magnetism of the field of the generator.

Other objects and a fuller understanding of my invention may be had by referring to the following description and claims, taken in conjunction with the accompanying drawing, in which the single view represents a diagrammatic illustration of a variable voltage system embodying the features of my invention.

In the diagram the variable voltage system comprises a generator 10 and a motor 11 having their armatures connected in loop circuit relation by means of conductors 14 and 15. The generator 10 may be driven by a prime mover 12 which may comprise any suitable driving means such, for example, as an alternating current motor or any other electrical or mechanical device. The motor 11 may be adapted to drive a load indicated by the reference character 13. The reference character 20 represents a main field winding for the generator 10 and the reference character 26 represents an auxiliary field winding for the generator. The main field winding 20 may be energized from direct current supply conductors 21 and 22 through an adjustable rheostat 23. The field winding for the motor 11 is designated by the reference character 24 and may be energized from the direct current supply conductors 21 and 22 through an adjustable rheostat 25.

The auxiliary field winding 26 for the generator 10 is adapted to be energized from alternating current supply conductors 27 and 28 through a transformer 29 and a rectifier 30. The excitation of the auxiliary field winding 26 may be adjustably governed by adjustable rheostats 34 and 35. In actual practice, either the series adjustable rheostat 34 may be employed alone or the parallel adjustable rheostat 35 may be employed alone, or both may be employed in combination. On a particular job, for example, the speed of the motor may be adjusted over a range of 40 R. P. M. to 700 R. P. M. by varying the field strength of the generator and thus the armature voltage, and over a range of 700 R. P. M. to 1200 R. P. M. by varying the field strength of the motor. Here, again, I do not like to limit my application to a condition where both voltage and field control are used but would like to have the application cover either voltage control alone or the combination of voltage and field control.

The regulating means for giving a greater corrective effect in the field strength of the generator at low generator voltages than at high generator voltages comprises a saturable core 36 having at least 3 windings 37, 38 and 39 thereon. The winding 37 is in series with the alternating current supply conductors that energize the primary winding of the transformer 29. The winding 38 is in series with the loop armature circuit between the generator 10 and the motor 11. The winding 39 is connected across the loop armature conductors 14 and 15.

The operation of my regulating device may be explained by assuming, at the present, that the winding 39 is omitted, under which assumption the arrangement would operate as follows: When there is no current in the loop armature circuit between the generator armature and the motor armature, the winding 37 produces a considerable amount of choking action and therefore tends to prevent any great amount of alternating current to flow from the alternating current supply conductors 27 and 28 to and through the primary winding of the transformer. Hence, practically no current is produced for energizing the auxiliary field winding 26 of the generator. As the current in the loop armature circuit between the generator and the motor tends to increase, the voltage of the generator would tend to drop, thus causing the speed of the motor to decrease. Under this condition the RI drop in the motor would also tend to increase, further reducing the speed of the motor. However, since the loop current passes through the winding 38 on the saturable core 36, a uni-directional flux is set up in the magnetic core which builds up toward saturation. As the saturable core becomes saturated, the choking effect of the coil 37 is reduced. This allows more alternating current to flow through the primary winding of the transformer, with the result that the rectified current flowing through the auxiliary field winding 26 is increased. This adidtional flow of current in the auxiliary field winding 26 of the generator produces more flux in the field of the generator and thus increases the voltage thereof, which in turn increases the speed of the motor 11.

If the increase in current in the loop armature circuit is carried on until a high value is reached, the saturable reactor or core 36 is designed to become practically saturated and the winding 37 has practically no choking effect upon the flow of the alternating current from the supply conductors 27 and 28 through the primary winding of the transformer. Therefore, it is noted, in the absence of the winding 39 upon the saturable reactor or core 36, that the changes or corrections in the excitation of the auxiliary field winding 26 is substantially proportional to the changes of the current in the loop armature circuit between the generator and the motor. The net result of the above action is that the regulator in the absence of the winding 39 produces a substantially constant speed corrective action throughout the entire range of operation. The term "constant" is employed to designate a percentage correction. As stated hereinbefore, a constant correction is undesirable since a greater corrective action is required at low generator voltages than at high generator voltages. A modification of the constant corrective action is produced by the winding 39 which is connected across the loop armature conductors 14 and 15. When the voltage is low, the flux produced by the winding 38 has a greater opportunity in modifying the choking action of the coil 37 than it does when the core 36 is completely saturated by the winding 39 as it will be when the generator voltage is high. In other words, under low voltage conditions, the core 36 is unsaturated and thus the flux action produced by the winding 38 is effective in regulating or modifying the choking action of the winding 37. However, as the generator voltage increases, requiring a reduced corrective action, the saturable core 36 becomes more saturated by the winding 39. As the generator reaches its maximum voltage condition, the core 36 is designed to be completely saturated or very nearly completely saturated under which condition the effect of the winding 38 becomes less. This, as was previously pointed out, is a desirable feature since a greater corrective action is present when the greater corrective action is needed and a lesser corrective action is present when little or no corrective action is required. Under conditions of high generator voltages, the saturation produced by the winding 39 is so great that whatever flux is produced by the winding 38 has very little effect upon the total saturation of the core 36, whereas under conditions of low generator voltages, the saturation produced by the winding 39 is not so great in which case the flux produced by the winding 38 makes an effect upon the total flux condition of the saturable core 36. By producing a greater corrective action at low voltage conditions than at high voltage conditions, the variable voltage system is such as renders the motor stable under all operating conditions.

As illustrated in the drawing, the auxiliary field 26 may be disconnected from the rectifier circuit by opening a switch 40 and may be connected across the armature of the generator 10 by closing a switch 41 to give a suicide effect to the auxiliary winding 26. This tends to destroy the residual magnetism of the generator and thence prevents creeping of the motor.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

1. The combination with a source of alternating current, a generator and a motor connected in loop armature circuit relation with each other, and a variable field winding for the generator to vary the voltage thereof and thus the speed of the motor, of regulation means to regulate the variable field winding, said regulation means comprising a transformer having a primary and a secondary winding, a rectifier, and a saturable core having at least three windings, means for connecting one of said windings in series with the loop armature circuit, means for connecting the second winding across the loop armature circuit, means for connecting the third winding and the primary winding of the transformer in series with the source of alternating current, the first and second winding addatively magnetizing the core to govern the impedance of the third winding and the voltage impressed upon the primary winding, said secondary winding energizing the rectifier to produce a direct current for energizing the variable field winding of the generator, the magnetomotive force produced by the second winding, under conditions of high generator voltage, substantially saturating the core and thus preventing the magnetomotive force of the first winding from materially varying the flux in the core and the impedance drop of the third winding, and the magnetomotive force produced by the second winding, under conditions of low generator voltage, being relatively small and enabling the magnetomotive force of the first winding to greatly vary the flux in the core and the impedance drop of the third winding, the variable flux condition in the core giving a greater regulation effect at low generator voltages than at high generator voltages.

2. The combination with a source of alternating current, a generator and a motor connected in loop armature circuit relation with each other, and a variable field winding for the generator to vary the voltage thereof and thus the speed of the motor, of regulation means to regulate the variable field winding, said regulation means comprising a transformer, a rectifier, and a saturable core having at least three windings, means for connecting one of said windings in series with the loop armature circuit, means for connecting the second winding across the loop armature circuit, means for connecting the third winding and the transformer in series with the source of alternating current, the first and second winding addatively magnetizing the core to govern the impedance of the third winding and the voltage impressed upon the primary winding, said transformer energizing the rectifier to produce a direct current for energizing the variable field winding of the generator, the magnetomotive force produced by the second winding, under conditions of high generator voltage, substantially saturating the core and thus preventing the magnetomotive force of the first winding from materially varying the flux in the core and the impedance drop of the third winding, and the magnetomotive force produced by the second winding, under conditions of low generator voltage, being relatively small and enabling the magnetomotive force of the first winding to greatly vary the flux in the core and the impedance drop of the third winding, the variable flux condition in the core giving a greater regulation effect at low generator voltages than at high generator voltages.

3. The combination with a source of alternating current, a generator and a motor connected in loop armature circuit relation with each other, and a variable field winding for the generator to vary the voltage thereof and thus the speed of the motor, of regulation means to regulate the variable field winding, said regulation means comprising a transformer, a rectifier, and a saturable core having at least three windings, means for connecting one of said windings in series with the loop armature circuit, said second winding being energized by a direct current source having a potential which varies substantially proportional to the voltage of the generator, means for connecting the third winding and the transformer in series with the source of alternating current, the first and second winding addatively magnetizing the core to govern the impedance of the third winding and the voltage impressed upon the primary winding, said transformer energizing the rectifier to produce a direct current for energizing the variable field winding of the generator, the magnetomotive force produced by the second winding, under conditions of high generator voltage, substantially saturating the core and thus preventing the magnetomotive force of the first winding from materially varying the flux in the core and the impedance drop of the third winding, and the magnetomotive force produced by the second winding, under conditions of low generator voltage, being relatively small and enabling the magnetomotive force of the first winding to greatly vary the flux in the core and the impedance drop of the third winding, the variable flux condition in the core giving a greater regulation effect at low generator voltages than at high generator voltages.

LLOYD E. MILLER.